Figures 1, 2:
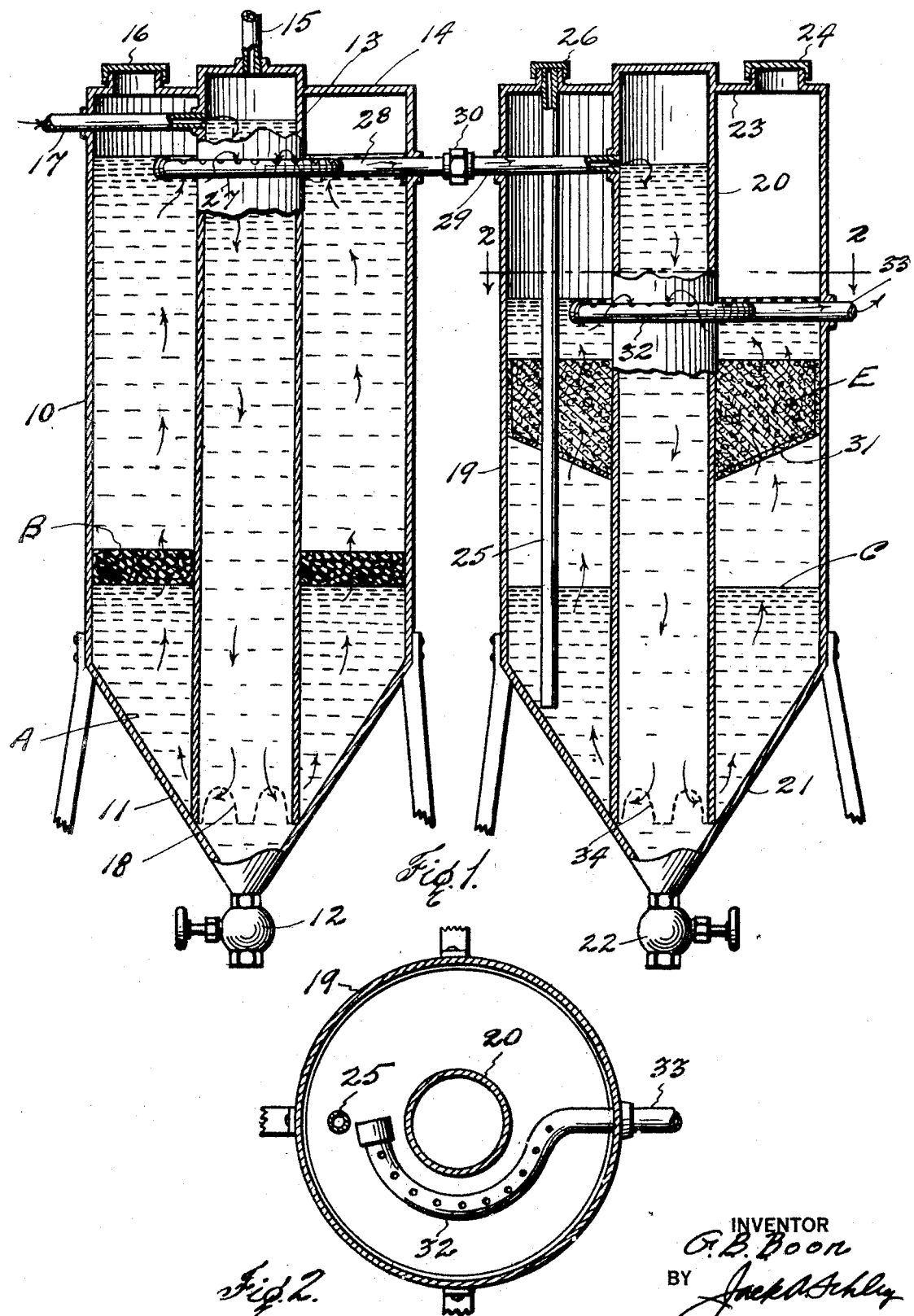

May 7, 1929.  G. B. BOON  1,711,829

PROCESS FOR THE PURIFICATION OF DETERGENT SOLUTIONS

Filed Jan. 16, 1928

INVENTOR
G. B. Boon
BY
ATTORNEY

Patented May 7, 1929.

1,711,829

UNITED STATES PATENT OFFICE.

GUTHRIE B. BOON, OF AUSTIN, TEXAS, ASSIGNOR TO R. R. STOLLEY, INC.

PROCESS FOR THE PURIFICATION OF DETERGENT SOLUTIONS.

Application filed January 16, 1928. Serial No. 247,021.

This invention relates to new and useful improvements in processes for the purification of detergent solutions.

One object of the invention is to purify or clarify the detergent liquid, such as gasolene, or other solvents, which are commonly used in dry cleaning establishments and which liquid becomes dirty and must either be filtered and clarified or thrown away.

It has been the practice to treat such liquids with caustic alkali or so-called lye, and also by passing the liquid or solvent, as it is termed in the trade, through water. So far as I am aware no process has yet been evolved whereby all of the moisture and traces of lye are removed.

A particular object of the invention is to pass the detergent solution through calcium chloride after the said solution has been passed through caustic alkali and activated charcoal in the usual manner.

The advantages of passing the solution or solvent through calcium chloride are many. By such a step traces of lye and moisture are more completely removed than is possible by a filter or any other means. No chemical is wasted as one charge of calcium chloride will last for an indefinite period and may be added to when necessary. By removing the traces of lye, moisture and impurities, the solvent will not sour as is now a common occurrence. By the elimination of a moisture trap or filter and by reducing the time required for settling, the clarification process is made more simple and an appreciable saving of time is obtained.

In order to better explain the process, I have illustrated an apparatus for carrying out the same, and reference is made to the accompanying drawings, wherein:

Fig. 1 is a vertical sectional view of an apparatus for carrying out the process, and Fig. 2 is a horizontal cross-sectional view taken on the line 2—2 of Fig. 1.

I will first describe the apparatus, but in so doing it is to be expressly understood that the apparatus is not the invention and the process may be carried out in any suitable manner.

In the drawings the numeral 10 designates an upright tank having a conical bottom 11 provided with a suitable drain valve 12. A vertical column or tube 13 is mounted in the center of the tank with its upper end extending through the top 14 and closed. An air vent 15 extends from the top of the column. The top 14 is provided with a filling cap 16.

The dirty gasolene or solvent is pumped into the top of the tank, or otherwise supplied, through a pipe 17 which discharges into the upper end of the column 13. The lower edge of the column 13 rests upon the conical bottom 11 and is provided with notches 18 through which the solvent escapes. A caustic solution A is deposited in the bottom of the tank and this is surmounted by a layer B of activated charcoal, potash, or any other cleaning agent suitable for the purpose. In the trade this material is known as "Darco".

The solvent escaping through the notches 18 and being of less specific gravity than the caustic solution A, will flow upward through said solution and thence through the layer B to the upper portion of the tank. This is the usual process and the dirt and other impurities will settle in the conical bottom 11 and may be drawn off through the valve 12.

In carrying out the process a second tank 19 similar to the tank 10 is provided. This tank also has a center column 20, a conical bottom 21 provided with a drain valve 22 and a closed top 23 provided with a filling cap 24. A water supply pipe 25 extends from the top 23 downward to the bottom 21 and has a closure cap 26.

A perforated drain head 27 is curved around the column 12 in the tank 10 and has a pipe extension 28 projecting through the side of the tank. The drain head is located just below the pipe 17 and being in the top portion of the tank will maintain the solvent on a level with its perforations. This gives the solvent time to settle after passing through the layer B and before discharging from the tank.

The pipe 28 is united with an inlet pipe 29 by a coupling 30. The pipe 29 extends into the tank 19 and discharges into the upper portion of the column 20. Water is introduced through the pipe 25 so as to fill the bottom portion of the tank 19 to the level marked C. Above this point a screen basket 31 surrounds the column 20 and is suitably secured within the tank below a perforated drain head 32 having a discharge pipe 33 leading through the tank. The drain head 32 is at a lower level than the pipe 29, as is shown in the drawings.

The solvent discharged by the pipe 29 flows down the column 20 and escapes through notches 34 into the bottom 21. Upon passing upward through the water the solvent is given a bath or rinse. The solvent will, of course, float on the water and upon passing upward it comes in contact with calcium chloride crystals E contained in the basket 31. This material will extract the water from the solvent and will also remove the traces of lye and other impurities from the solvent. After passing through the basket the purified and clarified solvent is drained off through the head 32 and pipe 33, from which it may be conducted to its place of use.

It will be seen that the moisture absorbed by the calcium chloride will drain back into the water below and will tend to neutralize any caustice alkali passing through said water. Periodically the valves 12 and 22 may be opened to drain off undesirable matter. It is possible to carry out this process by different structures and the particular arrangement described is not essential to the process. By the calcium chloride treatment, which removes lye traces and absorbs water, it is possible to hasten the clarifying process and it is not necessary to pass the discharge from the pipe 33 through a filter.

What I claim, is:

1. The process of treating a dry cleaning detergent liquid solvent consisting of treating said solvent with a caustic solution, removing a major portion of said caustic solution by passage through an aqueous body, and subsequently removing traces of the caustic from the solvent by treating the latter with calcium chloride.

2. The process of treating a dry cleaning liquid solvent, by which the solvent is first treated with a caustic solution, then passed through a bleaching material, then passing the solvent through a water bath, and then flowing the solvent through a body of calcium chloride whereby any remaining caustic solution and water are removed.

3. The process of treating a dry cleaning liquid solvent consisting of treating said solvent with a caustic lye solution, removing a major portion of said solution by passing the solvent through a water bath, and subsequently treating said solvent with calcium chloride to remove traces of lye and water previously introduced into said solvent.

4. The process of treating a dry cleaning liquid solvent consisting in introducing the solvent by a down flow beneath the surface of a caustic solution, withdrawing the solvent at a point above said solution and introducing it beneath the surface of an aqueous body, passing the solvent washed by said body through a solid dehydrating and neutralizing material in communication with the liquid of the body, and discharging the solvent at a point above said material.

In testimony whereof I affix my signature.

GUTHRIE B. BOON.